(12) United States Patent
Channabasavaiah

(10) Patent No.: US 8,352,555 B2
(45) Date of Patent: Jan. 8, 2013

(54) SCHEDULED ONLINE PRESENCE ON INSTANT MESSENGER

(75) Inventor: Prashanth Channabasavaiah, Nelamangala (IN)

(73) Assignee: Yahoo! Inc., Sunnyvale, CA (US)

( * ) Notice: Subject to any disclaimer, the term of this patent is extended or adjusted under 35 U.S.C. 154(b) by 456 days.

(21) Appl. No.: 11/864,405

(22) Filed: Sep. 28, 2007

(65) Prior Publication Data

US 2009/0049125 A1    Feb. 19, 2009

(30) Foreign Application Priority Data

Aug. 17, 2007   (IN) ........................... 1833/CHE/2007

(51) Int. Cl.
*G06F 15/16* (2006.01)
(52) U.S. Cl. ......... 709/206; 709/204; 709/205; 709/207
(58) Field of Classification Search ................. 709/204, 709/205, 206, 207
See application file for complete search history.

(56) References Cited

U.S. PATENT DOCUMENTS

| | | | | |
|---|---|---|---|---|
| 7,752,268 B2 * | 7/2010 | Shah | | 709/206 |
| 7,991,636 B1 * | 8/2011 | Groves | | 705/7.18 |
| 2005/0071426 A1 * | 3/2005 | Shah | | 709/204 |
| 2005/0114783 A1 * | 5/2005 | Szeto | | 715/747 |
| 2007/0226299 A1 * | 9/2007 | Shaffer et al. | | 709/206 |
| 2007/0226357 A1 * | 9/2007 | McMurry et al. | | 709/229 |
| 2008/0052389 A1 * | 2/2008 | George et al. | | 709/224 |
| 2008/0313039 A1 * | 12/2008 | Altberg et al. | | 705/14 |
| 2009/0043856 A1 * | 2/2009 | Darby | | 709/206 |
| 2009/0296734 A1 * | 12/2009 | Nag | | 370/462 |
| 2009/0318209 A1 * | 12/2009 | Gwaltney | | 463/9 |

* cited by examiner

*Primary Examiner* — Liangche A Wang
*Assistant Examiner* — Cheikh Ndiaye
(74) *Attorney, Agent, or Firm* — Martine Penilla Group, LLP

(57) ABSTRACT

The embodiments provide systems and methods which allow users to schedule routine online presence information to let outside world see the users appear to be "online" or "offline" at a particular day and time. An exemplary system of scheduling and displaying an online presence of a user of an instant messaging (IM) application is provided. The system includes an online presence scheduler for entering the time zone of the user and for scheduling an online schedule for the user to appear online. The online schedule includes a start time, an end time, and a routine of the user. The system also includes a presence management server (PMS). PMS determines the online presence of the user based on a login time of the user to the IM application, the online schedule for the user, and an identification of the user. The PMS prepares an online presence information to reflect the determined online presence of the user for display. The time zone and online schedule of the user entered into the online presence scheduler and the identification of the user are stored in the PMS.

19 Claims, 9 Drawing Sheets

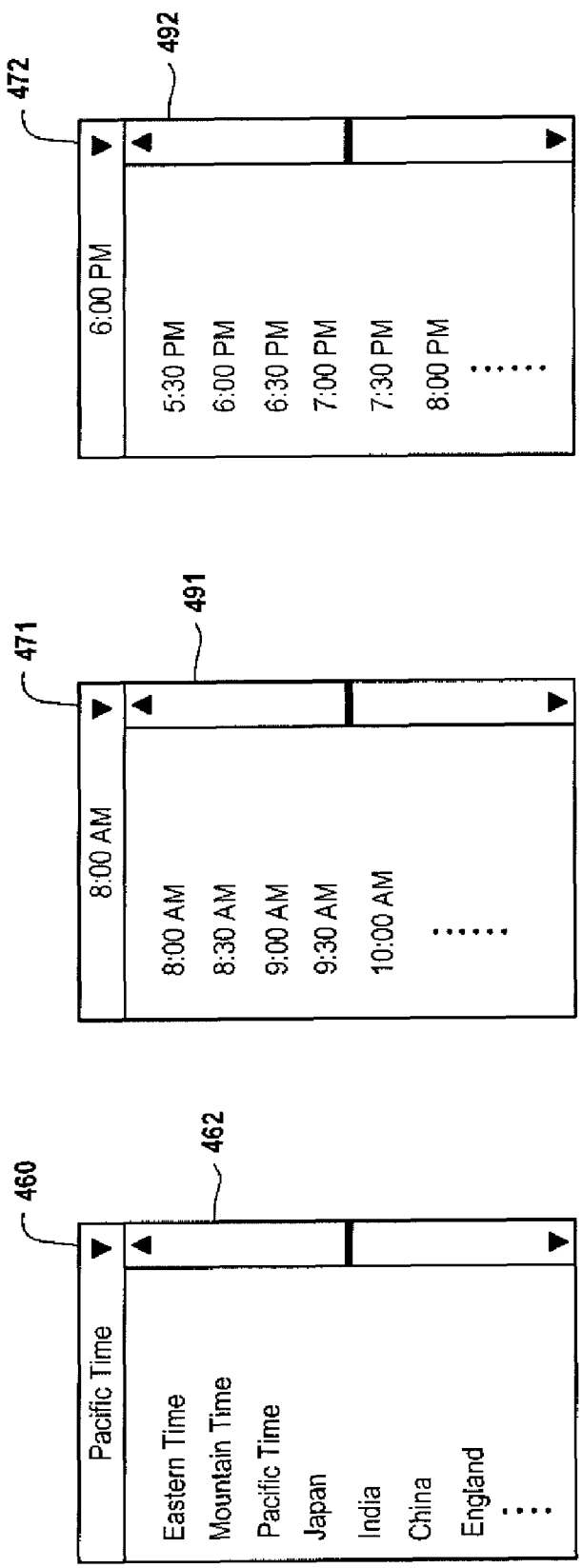

SCHEDULED ONLINE PRESENCE ON INSTANT MESSENGER

APPLICATION FOR CLAIM OF PRIORITY

This application claims the benefit of Indian Patent Application No. 1833/CHE/2007, filed Aug. 17, 2007, entitled "Scheduled Online Presence on Instant Messenger." The disclosure of the above-identified application is incorporated herein by reference.

BACKGROUND

1. Field of the Invention

This invention relates generally to the displaying of online presence of a user of an instant messenger (IM) or an instant messaging (IM) system. Specifically, the displayed online presence can be scheduled in advanced by the user.

2. Description of the Related Art

Instant messaging (IM) allows users to exchange information, such as text messages, files, voice, and videos, in real-time. The information exchanges occur between two or more people, who log into a particular IM service or IM services that interface with one another. Allowing for instantaneous communication between a number of parties at the same time, instant messaging can thus transmit information quickly and efficiently, as well as receive an immediate acknowledgement or reply. Therefore IM is an effective communication and collaboration tool. With the benefit of being able to see the other party using webcams, and even talking directly for free over the internet, this form of digital communication has been widely accepted by individuals of all ages.

As described above, instant messaging (IM) offers real-time communication and allows easy collaboration. IM might be considered more akin to genuine conversation than email's "letter" format. In contrast to e-mail, the parties know whether the peer is available. On the other hand, people are not forced to reply immediately to incoming messages. For this reason, some people consider communication via instant messaging to be less intrusive than communication via phone.

Most IM services offer presence (or status) information features, which indicate whether a user is currently online and available to exchange information or is offline and unavailable. These IM systems allow a user to manually set an "online presence (or status)" or "away message" so peers are notified when the user is available, busy, or away from the computer, after the user logs into IM systems. The above mentioned IM systems set a user to be "offline" (or unavailable) when the user logs off systems. Some IM systems also allow an user to appear "offline" while the user actually logs into the IM systems. However, manually setting an "online presence" or "away message" is undesirable, since it requires extra effort of a user to remember to take such an action.

In view of the foregoing, there is a need for systems and methods for setting and displaying programmable online presence information.

SUMMARY OF THE INVENTION

Broadly speaking, the embodiments of the present invention provide systems and methods which allow users to schedule routine online presence information to let outside world see the users appearing to be "online" or "offline" at a particular day and time. Such systems and methods provide online presence scheduling capability. Such systems and methods relieve the users from having to manually reset or modify the users' online presence information regularly. Using such systems and methods, a user can appear to be online or offline based on the user's preference at certain time periods of the day. Additionally, such systems and methods allow users to change their online presence information to be different from the "routine" online presence information, when the need arises. It should be appreciated that the present invention can be implemented in numerous ways, including as a method, a system, or a device. Several inventive embodiments of the present invention are described below.

In one embodiment, a method of scheduling and displaying an online presence of a user of an instant messaging (IM) application is provided. The method includes selecting a time zone of the user for an online presence scheduling. The method also includes setting an online schedule of the user, which includes a start time, an end time, and a routine of the user to appear online for the online presence scheduling. The user appears online when the user logs into the IM application during the online schedule and appears offline when the user logs into the IM application outside the online schedule. The method further includes determining the online presence of the user based on a login time of the user to the IM application, and the time zone and online schedule of the user. The login time is the time the user logs into the IM application. The time zone and the online schedule of the user are stored to enable the determining of the online presence of the user. In addition, the method includes displaying the determined online presence of the user in an IM control panel of the user.

In another embodiment, a system of scheduling and displaying an online presence of a user of an instant messaging (IM) application is provided. The system includes an online presence scheduler for entering the time zone of the user and for scheduling an online schedule for the user to appear online. The online schedule includes a start time, an end time, and a routine of the user. The system also includes a presence management server (PMS). PMS determines the online presence of the user based on a login time of the user to the IM application, the online schedule for the user, and an identification of the user. The PMS also prepares an online presence information to reflect the determined online presence of the user for display, and the time zone and online schedule of the user entered into the online presence scheduler and the identification of the user are stored in the PMS.

In yet another embodiment, computer readable media including program instruction for scheduling and displaying an online presence of a user of an instant messaging (IM) application are provided. The computer readable media include program instruction for selecting a time zone of the user for an online presence scheduling. The computer readable media also include program instruction for setting an online schedule of the user, which includes a start time, an end time, and a routine of the user to appear online for the online presence scheduling. The user appears online when the user logs into the IM application during the online schedule and appears offline when the user logs into the IM application outside the online schedule. The computer readable media further include program instruction for determining the online presence of the user based on a login time of the user to the IM application, and the time zone and online schedule of the user. The login time is the time the user logs into the IM application, the time zone and the online schedule of the user being stored to enable the determining of the online presence of the user. In addition, the computer readable media include program instruction for displaying the determined online presence of the user in an IM control panel of the user.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 4C show the time zone selections, in accordance with one embodiment of the present invention.

FIG. 4D shows the start time selections, in accordance with one embodiment of the present invention.

FIG. 4E shows the end time selections, in accordance with one embodiment of the present invention.

FIG. 6 shows a process flow diagram 600 for online presence

DETAILED DESCRIPTION

Figure 1:
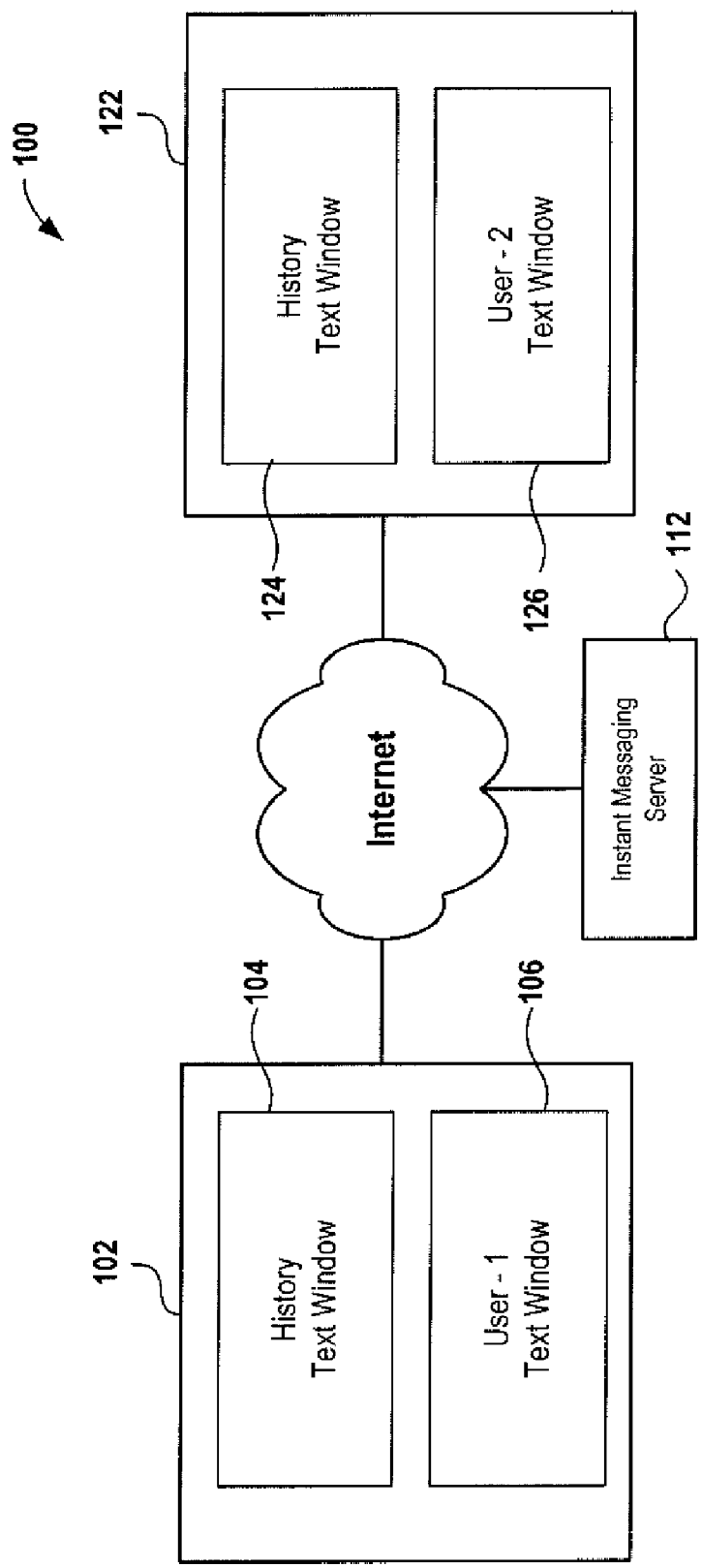
FIG. 1 show shows a diagram of an Instant Messaging (IM) system operating over the Internet, in accordance with one embodiment of the present invention.

Broadly speaking, the embodiments of the present invention provide systems and methods which allow users to schedule routine online presence (or status) information to let outside world see the users appearing to be "online" or "offline" at a particular day and time. Such systems and methods provide online presence scheduling capability. Such systems and methods relieve the users from having to manually reset or modify the users' online presence information regularly. Using such systems and methods, a user can appear to be online or offline based on the user's preference at certain time periods of the day. Additionally, such systems and methods allow users to change their online presence information to be different from the "routine" online presence information, when the need arises.

In one embodiment, presence information of a user mentioned above would appear on control panels of the user and other users who exchange IM messages with the user. These other users are on the user's buddy list and the user is also on these other users' buddy lists. Friends or colleagues who exchanges information through IM for personal or professional purposes put one another on the "buddy" lists.

IM applications typically provide default presence information for a user, such as "available", when the user logs into IM (or become online) or "unavailable" when the user logs off IM (or become offline). Some IM systems allow a user to appear "offline" when the user is actually "online". This situation can happen when a user is exchanging information with a friend after work through IM and the user does not want his colleagues from work know that he is using IM. The user might want to avoid IM exchange requests from colleagues after work hours. As described above, some IM systems allow a user to appear "offline" when the user is actually "online". These IM systems require users manually change the default presence information into a non-default presence information.

The user might want to display a regular and scheduled online presence (or online status) to people on the user's buddy list. For example, a user might want to appear to others as "offline" between 6 pm to 10 pm everyday to avoid getting IM requests from people. Even though the user might use IM to communicate with one or more of his/her friends between 6 pm to 10 pm occasionally. Therefore, the user would prefer that his/her online presence to appear as "offline" to the outside world. Only the friends or acquaintances that the user is using the IM to exchange messages with know that the user is actually online.

Current IM applications do not have such a feature or function to allow users to set routine online presence information. In view of the foregoing, there is a need for systems and methods for setting and displaying routine online presence information. When users log into the IM application, the routine online presence information shows the online presence information that the users want others to see, regardless of the whether the user is online or offline.

FIG. 1 shows a diagram illustrating an embodiment of an Instant Messaging (IM) system 100 operating over the Internet. In this embodiment, USER-1 and USER-2 exchange instant messages. An Instant Messaging (IM) client creates an Instant Messaging (IM) window 102 of USER-1 on an IM client of USER-1. The IM window 102 of USER-1 is a graphical user interface. IM window 102 of USER-1 generally includes a history window 104 containing messages that have been exchanged in the past, and a new text window 106 for new messages to be entered by USER-1. USER-1 enters messages to communicate with USER-2 in text window 106. The text in the text window 106 can be entered by typing in characters or symbols through a keyboard. Alternatively, USER-1 can "speak" numbers, characters, words or sentences to a speaker. A voice recognition decoder can then translate the spoken characters, numbers, words or sentences into texts appear on the text window 106.

A second Instant Messaging client of USER-2 also creates an Instant Messaging (IM) window 122 of USER-2. IM window 122 of USER-2 also includes a history window 124 and a new text window 126. USER-2 enters messages he/she communicates with USER-1 in text window 126. A history window 124 contains messages that have been exchanged between USER-1 and USER-2 earlier. Instant Messaging window 122 displays a message sent from Instant Messaging window 102 via message server 112.

An IM server 112 is also connected to the Internet to interact with the Instant Messaging window 102 of USER-1 and the Instant Messaging window 122 of USER-2. In various IM systems, the message server may perform different functions such as receiving messages and transferring them, replacing certain text with symbols, or otherwise modifying or relaying messages. In addition, the Instant Messaging client may display various menus and buttons that activate common Instant Messaging functions such as changing font, ringing another user, inserting symbols, etc.

Figure 2A:
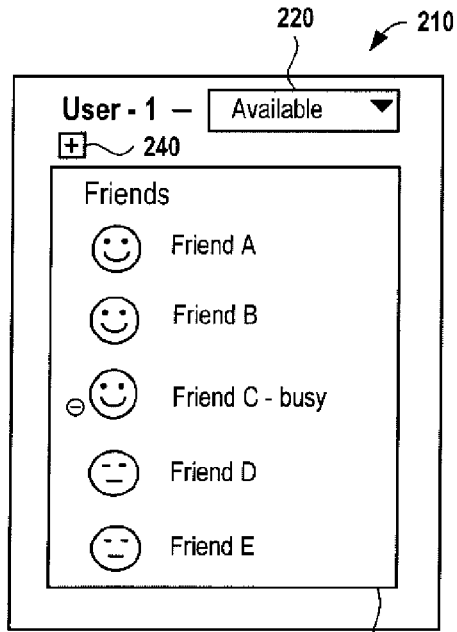
FIG. 2A shows an IM control panel 210, in accordance with one embodiment of the present invention.

FIG. 2A shows an embodiment of an IM control panel 210 for USER-1. The IM control panel 210 is also an IM client. In this IM control panel 210, there is a list (friend list or buddy list) 230 of friends, which includes friends, colleagues and acquaintances, which USER-1 communicates through IM. List 230 shows that USER-1 has "Friend A", "Friend B", "Friend C", "Friend D", and "Friend E" on USER-1's friend list (or buddy list). Next to the name of each "friend", there is an icon that reflects the online presence (or online status) of the friend. For example, next to "Friend A", there is an icon with a smiley face, which is used to indicate that "Friend A" is online (or available) for IM exchanges. In contrast, next to "Friend D", there is an icon of non-smiley face, which is used to indicate that "Friend D" is not online (or offline, unavailable) for IM exchanges. In addition to simple icons that reflect whether a user is online or offline, additional online presence description can be used. For example, next to "Friend C", there is a smiley face with a circle, which has a short horizontal bar inside the circle. The circle with the short horizontal bar resembles a stop symbol for traffic sign. Next to "Friend C", there is also a text of "busy", which is used to indicate that "Friend C" is busy. The icon and text next to "Friend C" shows that although "Friend C" is available, "Friend C" is busy. The circle with the short horizontal bar is used to show that although "Friend C" is online, but "Friend C" might not be free for IM changes. If USER-1 wishes to exchange messages with "Friend C", USER-1 might not receive an instant response. Additional coloring of the icon can also be used to emphasize the presence of the users. For example, the smiley face icons next to "Friend A", "Friend B", and "Friend C" might be colored with a bright yellow color to emphasize that these three friends (or buddies) are online. In contrast, the non-smiley face icons next to "Friend D" and "Friend E" might be colored with a dull gray to show that these two friends are offline and not available. The online presence (or online status) icons and texts in IM control panel 210 allow USER-1 to tell if his/her friends are online for exchanging messages with USER-1.

Figure 2C:
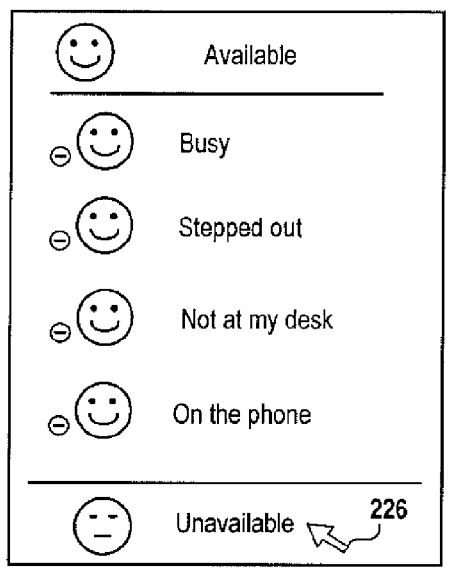
FIG. 2C shows various online presence available for a user to select, in accordance with one embodiment of the present invention.
Figure 2B:
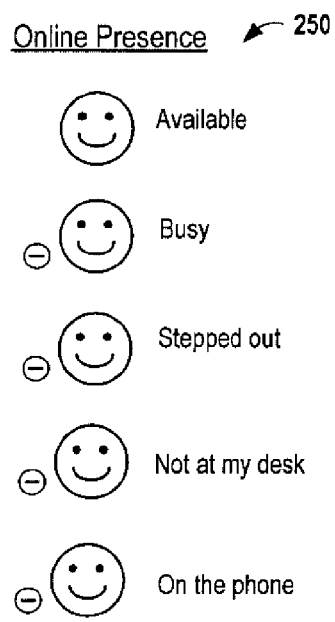
FIG. 2B shows examples of online presence symbols and texts, in accordance with one embodiment of the present invention.

FIG. 2B shows a few examples of online presence symbols and texts, which includes online presence 250 and offline presence 260. Other icons (or symbols) and texts can be used too.

In addition to list 230 of friends, there could be a button 240 which allow USER-1 to add people to his list 230 of friends. IM control panel 210 can also include a field 230 next to the name of USER-1 that shows the online presence of USER-1. In the example of FIG. 2A, USER-1 is shown to be "Available" in field 230. This "Available" online presence is a default online presence set by the system when a user logs into IM. This "Available" online presence is also shown in the online presence of lists of friends, similar to list 230, in control panels of users who have USER-1 in their friend lists. In some IM system if a user has manually set his/her online presence to be "offline" (or "unavailable"), the default online presence when the user logs into the IM system is "offline".

Field 230 can also be used to modify the online presence of USER-1. If USER-1 wishes to appear "offline" to the outside world, USER-1 can click on field 220. The arrow next the text "Available" in field 220 indicates that there are other selections available. When field 220 is clicked, a window 225 appears below field 220, as shown in FIG. 2C in accordance with one embodiment of the present invention. Window 225 lists the other online presence available for USER-1 to select. USER-1 can move the cursor 226 next to the selection of a non-smiley face with text "Unavailable", which are used to indicate an offline presence, and make a click. Such selection would prompt the text in the field 220 to be changed to "Unavailable". The existing IM systems require users, such as USER-1, to manually change the default presence information into a non-default presence information.

As discussed above, an IM user might want to display a regular and scheduled online presence to people on the user's buddy list. For example, a user might want to appear to others as "online" between 8 am to 6 pm and "offline" the rest of the day everyday to avoid getting IM requests from people between 6 pm to 8am the next day. Even though the user might use IM to communicate with one or more of his/her friends after 6 pm, such as between 6 pm to 10 pm, occasionally, the user does not want his/her colleagues to know. Therefore, the user would prefer that his/her online presence to appear as "offline" to the outside world. Only the friends or acquaintances that the user is using the IM to exchange messages with know that the user is actually online.

As discussed above, the existing IM systems do not provide such a scheduling feature or function. Users of IM need to manually change the online presence from "available" (or "online") to "unavailable" (or "offline") when users utilizes IM during the hours that the users do not want outside world to know that the users are online. In addition, the users need to remember to change the online presence back to "available" when the users log into IM systems again during hours that the users want to appear online. All these presence changes require additional effort and attention from the users.

Figures 3A, 3B:
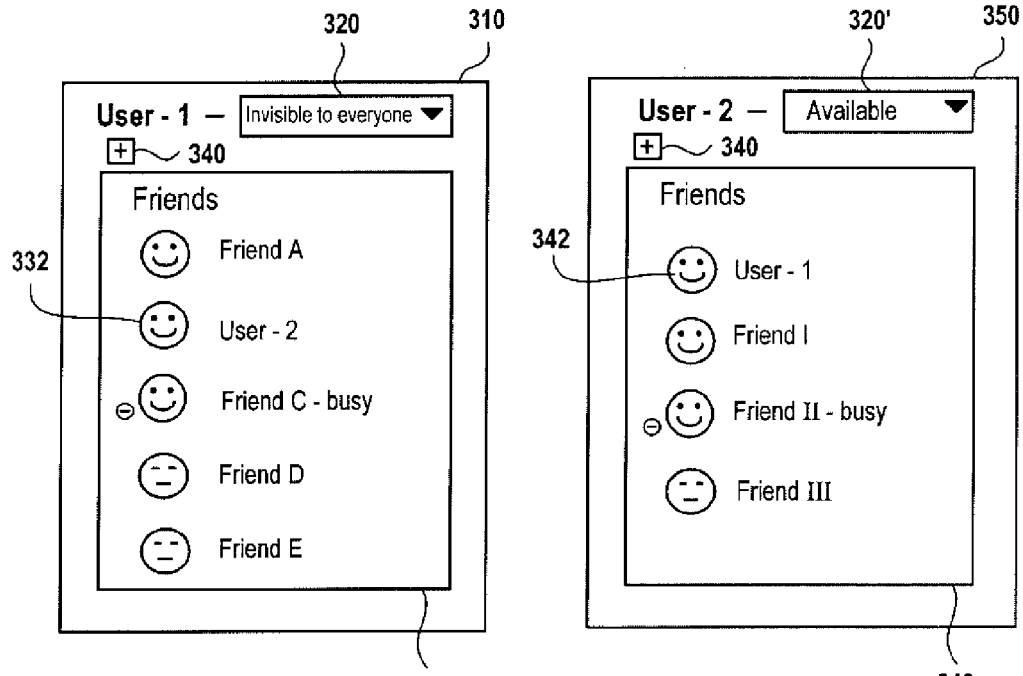
FIG. 3A shows an IM control panel 310 for a user, in accordance with one embodiment of the present invention.
FIG. 3B shows an IM control panel 350 of a friend of the user of FIG. 3A, in accordance with one embodiment of the present invention.

FIG. 3A shows an embodiment of an IM control panel 310 for USER-1. The control panel 310 is very similar to the IM control panel 210 described above. In this embodiment, USER-1 has a friend USER-2, who is "Online" (or available) according to the presence information 332 of USER-2. The difference of FIG. 3A from FIG. 2A is that USER-1 click on the button 220 of FIG. 2A to appear "Offline" or "Invisible to Everyone". The reason could be that USER-1 needs to perform IM exchanges with one of his friend, such as "Friend A", and does not wish to let others know that he/she has logged into IM. Therefore, USER-1 would like to appear to be "Offline" and "Invisible to Everyone.

FIG. 3B shows an embodiment of an IM control panel 350 of USER-2, who logs into IM at about the same time as USER-1. Since USER-1's online presence is set to be "Offline" or "Invisible to Everyone", the presence information 342 of USER-1 in USER-2's control panel 350 is "Offline" (with a non-smiley face). When USER-2 sees the presence information 342 of USER-1, USER-2 thinks that USER-1 is "offline" and would most likely not initiate IM exchanges with USER-1. However, USER-1 is actually online and could possibly be engaging in IM changes with "Friend A".

As discussed above, existing IM applications do not allow scheduled online presence. Users would appear either online or offline based on users' login presence with IM or based on users' manual resetting. However, as discussed above, sometimes users would like to maintain certain online or offline presence in a preset time period on a routine basis. For example, users, such as USER-1, use IM for work and for personal usage. USER-1 might use IM to exchange messages with his/her colleagues either locally or in remote locations for work purposes. For example, USER-1 uses IM to exchange messages with his/her colleagues during his/her work hours from 8am to 6 pm. USER-1 logs into IM during work hours and uses IM to exchange messages with colleagues for work related or non-related issues. USER-1 wants his/her colleagues to know that he/she is available during work hours. During work hours, such as 8am to 6 pm, USER-1 engages in different IM sessions with different people on his/her IM friend list and appears to be "online" during work hours.

However, after work, such as after 6 pm, USER-1 no longer wishes his colleagues to contact him on job related issues. USER-1 might still want to use IM for his/her personal exchanges. USER-1 could reset his/her online presence manually to make USER-1 appear offline to everyone on his/her IM list of friends. However, this takes effort on USER-1's part and USER-1 has to remember to take such an action. In addition, in some IM systems, if USER-1 has manually made his/her online presence to appear "unavailable to everyone", USER-1 would have to reset the online presence to "available" when USER-1 log into IM next time. Otherwise, USER-1 would appear to be "offline" after USER-1 logs in. If USER-1 forgets to modify his/her online presence correctly, USER-1 could appear offline during work hour and appear online after work, both are undesirable to USER-1. Therefore, it is desirable to have a system and a method that that allow users, such as USER-1, to pre-set or pre-schedule online presence. Such pre-setting would save users time and effort and can more accurately reflect users' desired online presence.

Figure 4A:
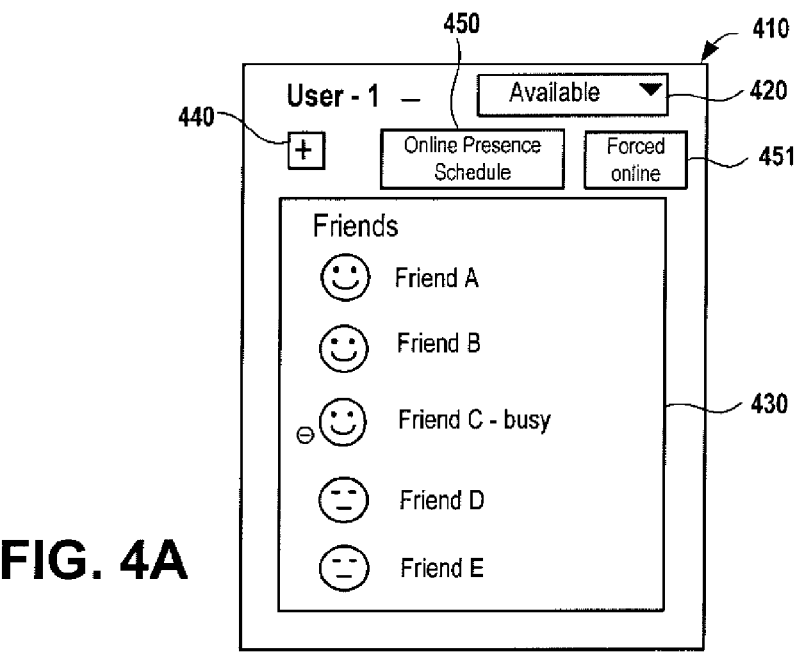
FIG. 4A shows an IM control panel with an online presence schedule button, in accordance with one embodiment of the present invention.
Figure 4B:
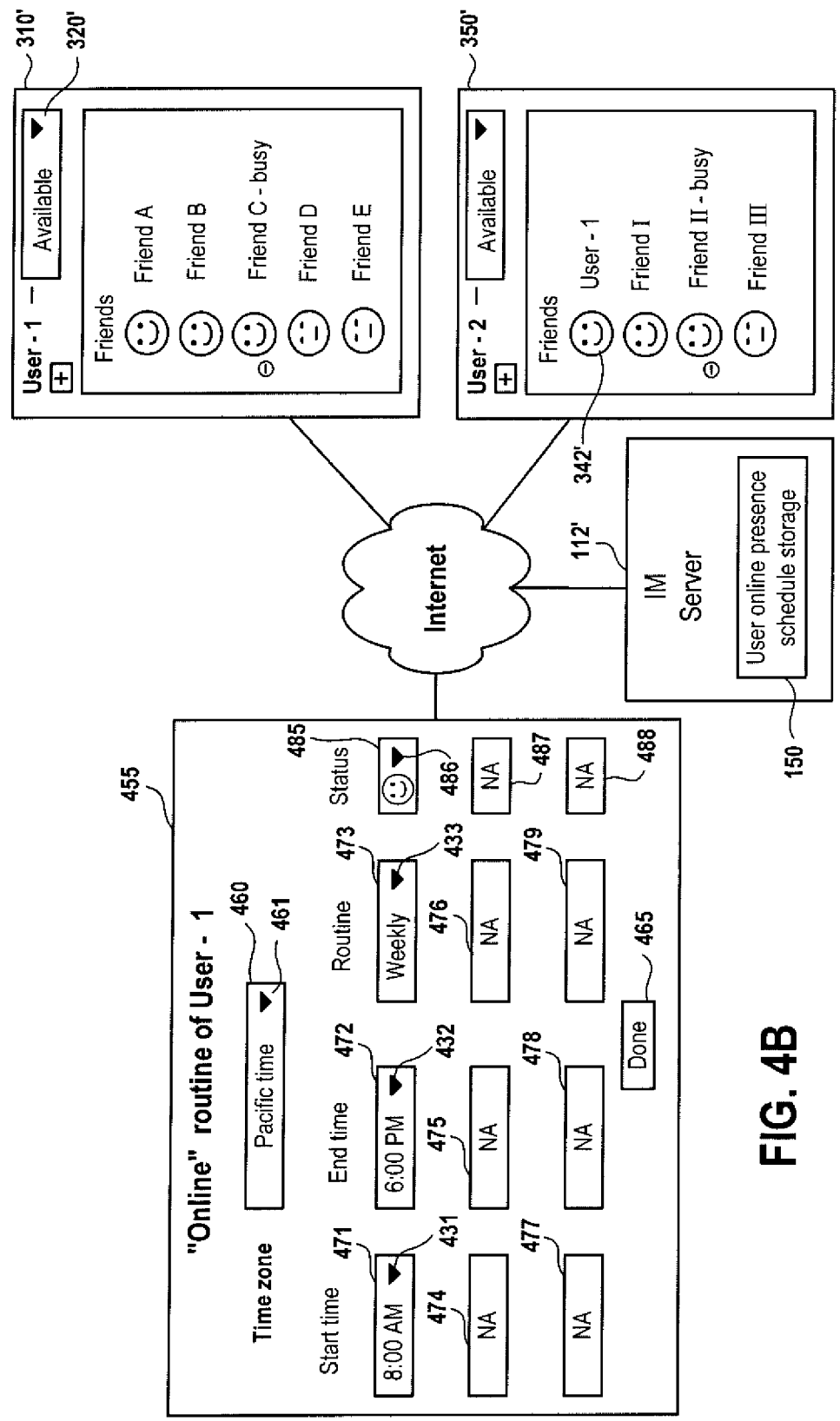
FIG. 4B shows an online presence scheduler coupled to the Internet, an IM server and control panels, in accordance with one embodiment of the present invention.
Figure 4F:
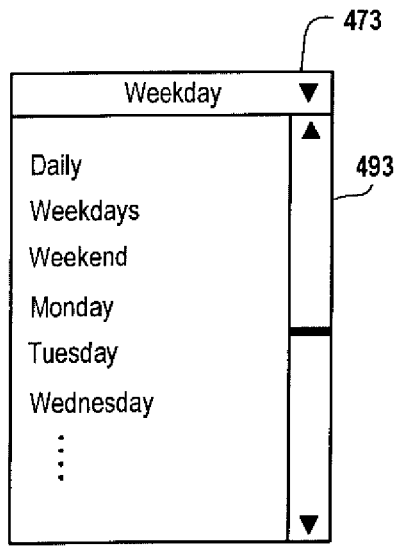
FIG. 4F shows the routine selections, in accordance with one embodiment of the present invention.

FIG. 4A shows an embodiment of an IM control panel 410 of USER-1. In control panel 410, there is an "online presence schedule" button 450. USER-1 can click on button 450 to schedule his/her preferred online presence during particular period(s). When USER-1 clicks on button 450, an online presence scheduler 455, as shown in FIG. 4B, appears. FIG. 4B shows an embodiment of an online presence scheduler 455, which appears after a user click on the "online presence schedule" button 450, for scheduling a routine that shows USER-1 is "online". During the time period(s) not chosen, USER-1 would be shown "offline" (or unavailable).

In the online presence scheduler 455 there is a time zone setting box 460, start time selection boxes, 471, 474 and 477, end time selection boxes, 472, 475, and 478, and routine selection boxes 473, 476, and 479. USER-1 can use the time zone setting box 460 to set the time zone that the user is currently at. User can click on the arrow 461 to get a list of time zones of United States and countries to choose from. When USER-1 click on arrow 461, a list 462 of time zones would show below box 460, as shown in FIG. 4C, in accordance with one embodiment of the present invention. If the user is in a place at west coast, such as San Jose, Calif., the user can move the cursor over "Pacific Time" and click on the selection. Alternatively, if the user is in Japan, the use can move the cursor over to "Japan" and make a selection. The time zone allows the USER-1 to travel to locations in different time zones and allows USER-1 still to maintain the online presence routine consistent with the local time. For example, USER-1 can be based in California. When USER-1 travels to work in Japan, USER-1 can maintain USER-1 preferred online presence schedule, such as appearing "online" between 8 am to 6 pm, according to the local time. The selections shown in FIG. 4C are just examples. Alternatively, other ways of displaying time zones for setting time zone can also be used.

Once the time zone of USER-1 is set, the list 462 disappears and USER-1 is brought back to scheduling window 455. After the time zone is selected, the user can select the start time, end time and routine which show USER-1 is "online". Boxes 471, 472 and 473 form a set of schedule selection for online presence scheduling. Similarly, boxes 474, 475, 476 form another set, and boxes 477, 478, and 479 form yet another set. Although the embodiment shown in browse 455 includes 3 selection sets, only 1 set is needed. Alternatively, additional selection sets can be added to provide additional scheduling choices.

USER-1 can choose the start time, which shows that he/she is "online" by clicking on button 431 of box 471. When button 431 is clicked, a list 491 of start time is shown below box 471, as demonstrated in FIG. 4D, in accordance with one embodiment of the present invention. USER-1 can choose a start time of a routine, which shows that USER-1 is online. In one embodiment, the start time is the time that USER-1 starts to work. For example, USER-1 can choose 8 am as his/her start time. USER-1 moves the cursor (or mouse) over the desired start time and clicks to make a selection. For example, USER-1 can choose "8:00 AM" as his/her start time. Once the selection is made, the expanded time selection collapses and only the selected time, such as "8:00 AM", is shown in box 471. Afterwards, user can choose the end time that shows that the user is online by using box 472. Similar to the selection of start time, end time selection can be revealed by clicking on arrow 432. A list 492 of end time can be found below box 472, as shown in FIG. 4E, in accordance with one embodiment of the present invention. For example, user can choose "6:00 PM" as the end time.

Alternatively, the start time and end time in boxes 471 and 472 can be entered by key board, instead of choosing by clicking on a selection. After the start time and end time are chosen, the routine of showing the online presence with the selected start time and end time is selected by using box 473. When user clicks on the arrow (or box) 433 of box 473, a list 493 of routine selection appears. The routine can include "daily", "weekdays", "weekend", "Monday", "Tuesday" . . . etc. If a routine, such as "weekday", is chosen, USER-1 would be shown to be "online" when USER-1 logs into IM, from the start time, such as 8 am, to end time, such as 6 pm, during the weekdays. During the rest of the time, USER-1 is shown to be "offline" regardless whether USER-1 has actually logged off IM or not.

In addition to selecting an online presence routine by using boxes 471, 472, and 473, additional online presence can be shown by using boxes 474, 475, and 476, in a manner similar to selecting a routine using boxes 471, 472, and 473. Additional online presence can also be set by using boxes 477, 478, and 479. Alternatively, the system can be made to allow additional choices. Once the selection is complete, USER-1 can click on the "Done" button 465 to end the online presence scheduling session.

In one embodiment, there are status setting boxes 485, 487, 488, next to the 3 time selection choices, as shown in FIG. 4B. In addition to selecting "available" (with the smiley face symbol), USER-1 can choose other status (or presence) symbols, such as the ones shown in FIG. 2C. For example, USER-1 might regularly eats lunch between 12 noon to 1 pm. In this case, USER-1 can choose a start time of 12 pm, an end time of 1 pm, a routine of weekday, with a status symbol of a smiley face with a stop symbol representing "not at my desk", as shown in FIG. 2C. This symbol (or symbol accompanied by text) would allow friends of USER-1 to know that USER-1 is away from the desk between 12 noon to 1 pm. USER-1 can use arrow 486 to choose different status (or presence) symbols. In the example illustrated here, symbols are used to represent online presence (or status). However, they are merely used as examples. Other representations of online presence, such as texts, can also be used.

Figure 4G:
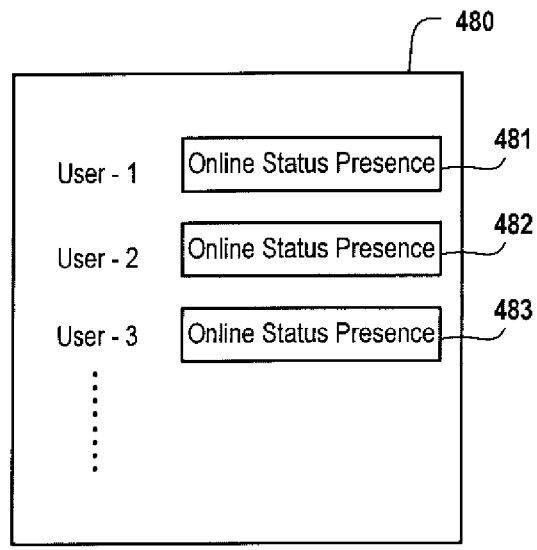
FIG. 4G shows a database of a user online presence schedule storage, in accordance with one embodiment of the present invention.

As shown in FIG. 4B, the scheduling window 455 is connected to an IM server 112 through the Internet, in accordance with one embodiment of the present invention. In one embodiment, the scheduling information entered would be stored in a user online presence schedule storage 150 in the IM server 112. Alternatively, the user online presence schedule storage 150 can be in a separate server that is coupled to IM server 112. User online presence schedule storage 150 is a database that includes the online presence scheduling for IM users coupled to the IM server 112. FIG. 4G shows an example of a database 480 of the user online presence schedule storage 150. In the database 480, there are records, such as records 481, 482, 483, etc., for all users coupled to the IM server 112 of FIG. 4B. Records 481, 482 and 483 contain time zones, start times, end times, and routines of USER-1, USER-2, and USER-3.

The online presence schedule entered by USER-1 would reflect on the control panel 310' of USER-1 and control panel 350' of USER-2, both are logged into IM and USER-2 has USER-1 on the friend list. If other people on USER-1's friend list are also logged into IM, they would able to able to see USER-1's online presence, just like USER-2. If the current time is 10 am, which is between 8 am and 6 pm, USER-1's online presence 342' on USER-2's control panel 350' would appear to be "online" or "available", as shown in FIG. 4B.

Figure 5A:
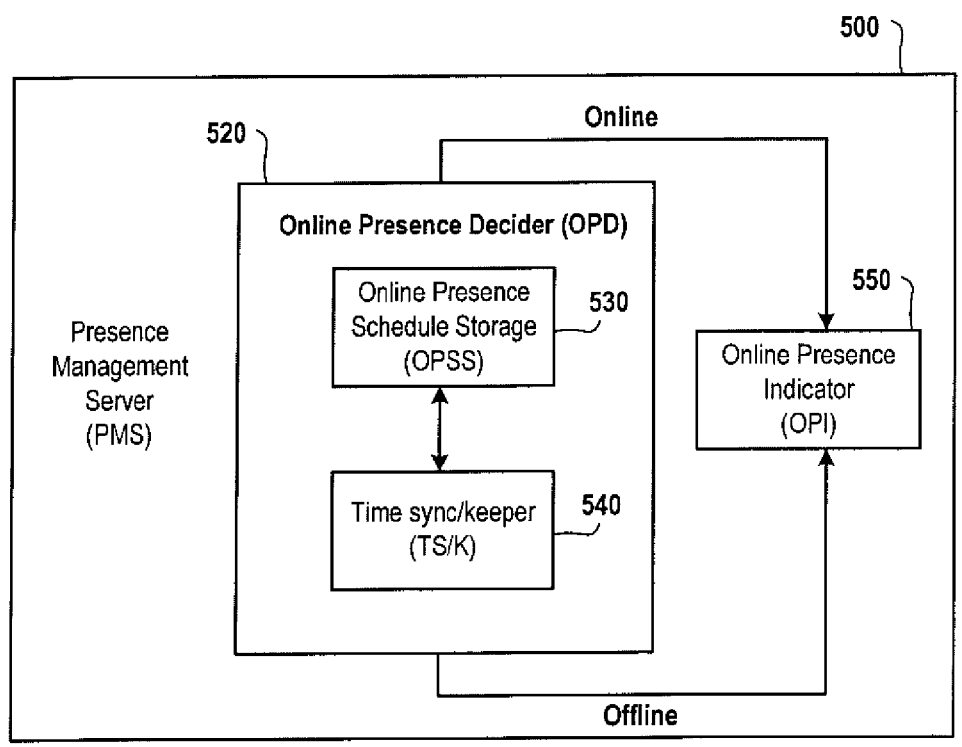
FIG. 5A shows a presence management server, in accordance with one embodiment of the present invention.

FIG. 5A shows a presence management server (PMS) 500, in accordance with one embodiment of the present invention. PMS 500 determine the online presence of an IM user. The presence management server 500 can be in an IM server, such as an IM server 112 described earlier in FIGS. 1 and 4B, or in a separate server coupled to an IM server. In the PMS 500 shown in FIG. 5A, PMS 500 includes an online presence decider (OPD) 520. PMS 500 receives a user's login information, which include user's identity information and the time that user login and pass them to OPD 520. OPD 520 decides if the user is scheduled to appear as "online" or "offline" at the login time. The online status decider (OPD) 520 includes an online status schedule storage (OPSS) 530, which is similar to the user online presence schedule storage 150 of FIG. 4B, and a time synchronizer and keeper (TS/K) 540. OPSS 530 stores a user's scheduled online presence information, which includes user's selected time zone and user's selected duration to appear "online", which includes start time, end time and routine (or frequency) of the start time and end time as described in FIGS. 4B-4G. TS/K 540 synchronizes the login time the user with the time of the PMS 500 and keeps the time zone of the users. TS/K keeps track of the time at the user's selected time zone to allow the system to decide if the user is "online" or "offline" according to the scheduled online presence information.

If a user who lives and works in California and has scheduled the online presence information while in California, this user would need to reset his/her time zone to allow system 500 to perform time synchronization, if this user travels to Japan for a business trip. This time zone resetting due to time zone change would allow PMS 500 to would decide the user's online presence correctly.

After OPD 520 decides if the user is "online" or "offline", the decision is passed to an online presence indicator (OPI) 550, which prepares the online presence information to reflect the user's online presence at the login time. For example, if the OPD 520 decides that the user is "online" at login time, OPI 550 would present user's online presence as "online" on user's control panel and on control panels of users, who have the user on their friend lists and are online themselves.

After USER-1 logs in, IM server 112 would verify the online presence of the user regularly to see if the user, such as USER-1, is still logged in, in accordance with one embodiment of the present invention. IM server 112 sends PMS 500 identity information of users who are currently login and current time to verify the scheduled online presence of these users. In one embodiment, the online presence checking is performed every 5 minutes. In another embodiment, the online status checking is performed everyone 15 minutes. Any frequency of checking is possible. The frequency is determined by the system setup. If a user's online presence has changed, the changed presence would reflect on control panels showing the user's presence.

Figure 5B:
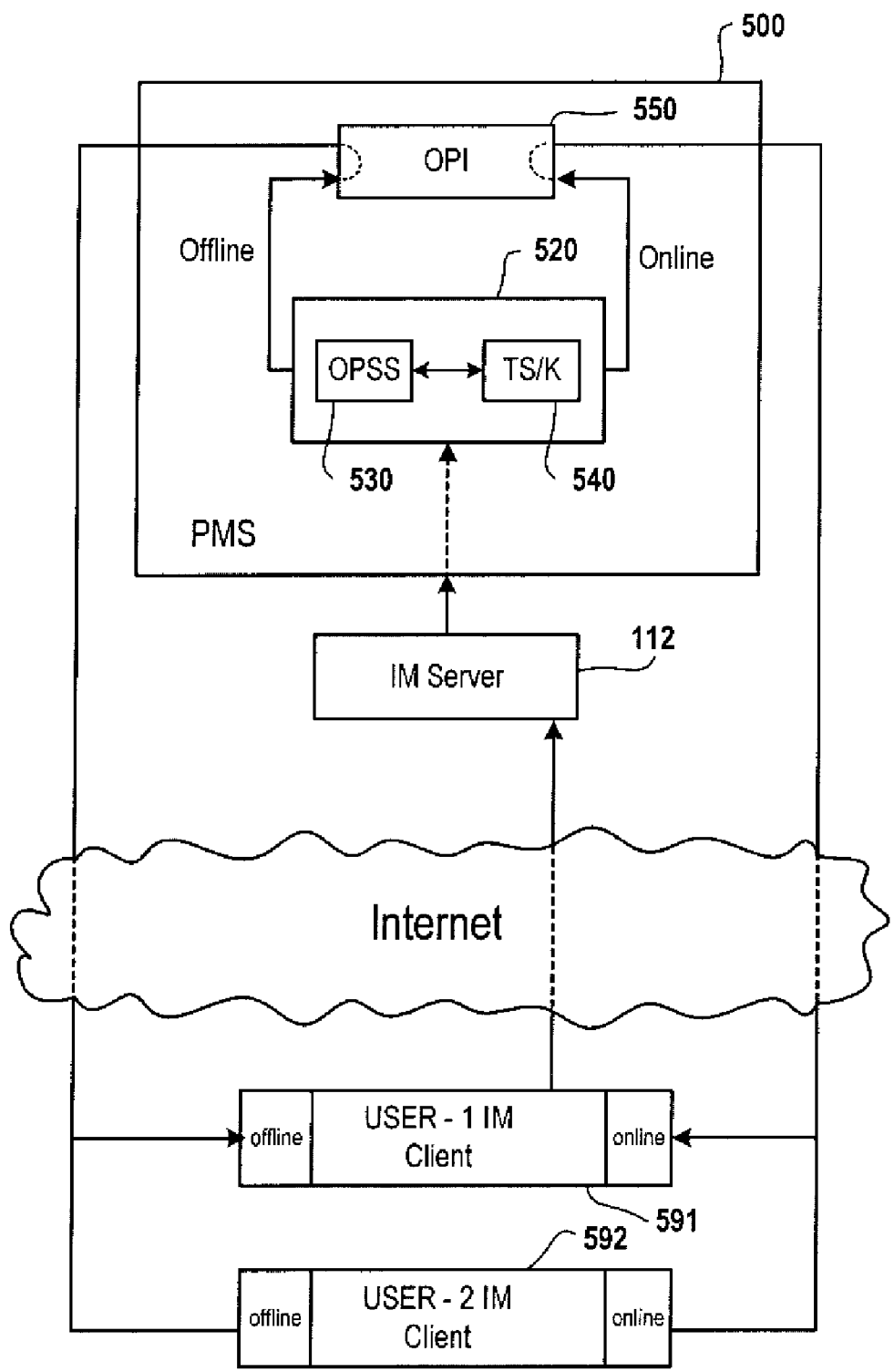
FIG. 5B shows an IM client interacting with an IM presence management server through an IM server, in accordance with one embodiment of the present invention.

FIG. 5B shows an embodiment of an IM client 590 interacting with PMS 500 through an IM server 112. The IM client 590 sends login information to IM server 112. The IM server 112 passes the user's login information, which includes user's name (or identification) and user's login time, to PMS 500.

The PMS 500 passes the login information to OPD 520 in a manner described above. The OPSS 530 and TS/K 540 of OPD 520 decide the online status of the user and pass the decision to OPT 550 to prepare online presence of the user, such as USER-1, and returns the information to the IM client 590, such as of USER-1, and an IM client of another user, such as USER-2, who has the user on his/her list of IM friends and is currently logged in. Although only one control panel 592 of a friend of the user is shown in FIG. 5B, additional control panels of friends of the users who are currently logged in could also be receive correct online presence from PMS 500.

In this embodiment, PMS 500 is separate from the IM server 112. In another embodiment, PMS 500 is integrated in the IM server 112. As mentioned above, after a user logs in to IM server 112, IM server would verify and modify to see if the user's online presence regularly until the user logs off.

Figure 5C:
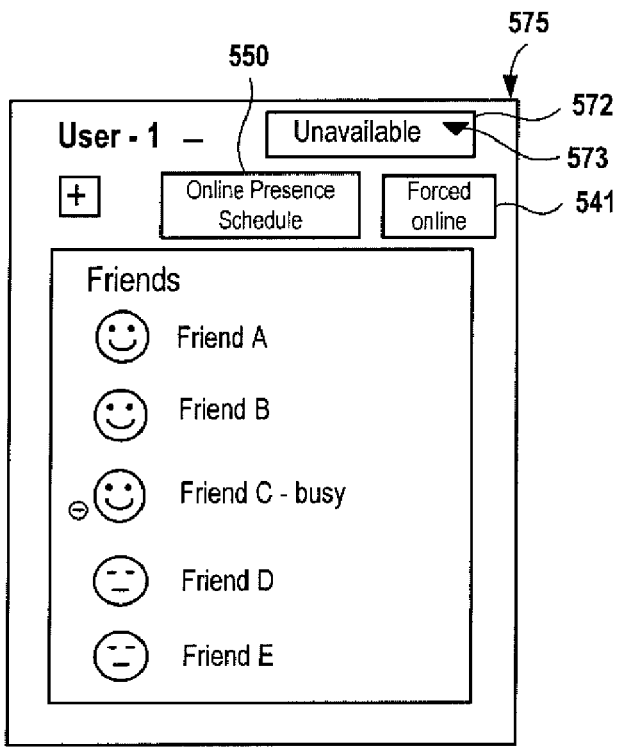
FIG. 5C shows an IM control panel with a "forced online" button, in accordance with one embodiment of the present invention.

If a user, such as USER-1, wants to appear to be "online" at 10 pm, against the scheduled online presence setup, the user, such as USER-1, can perform a "forced online" action, in accordance with one embodiment of the present invention. FIG. 5C shows an embodiment of a control panel 575, which has a "forced online" button 551. The "forced online" button 551 allows USER-1 to change his/her online presence from offline to online at an offline time, such as 10 pm. USER-1 might want to do this because USER-1 has an important project that he/she needs to work on after his/her regular work hours. USER-1 needs to let colleagues know that he/she is online to exchange messages with them. Another example is that USER-1 might want to exchange IM with his friends on a weekend, which he normally is scheduled to be offline. The "forced online" button 451 in FIG. 4A can perform the same function.

Figures 5D, 5E:
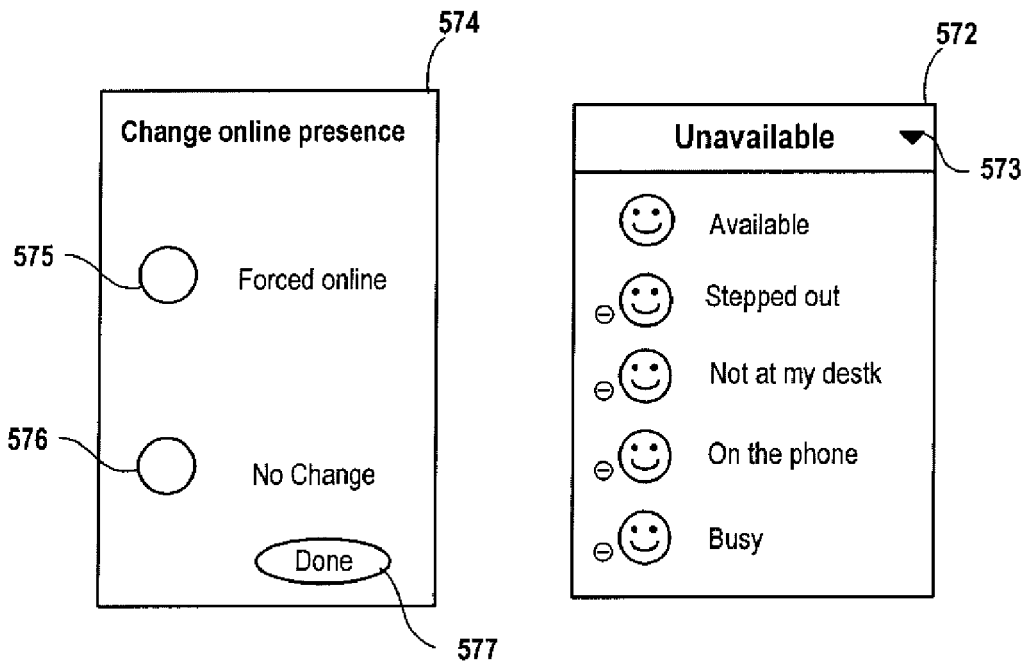
FIG. 5D shows a window that allows online presence change, in accordance with one embodiment of the present invention.
FIG. 5E shows a window a list of online presence for a user to choose in order to change the user's online presence, in accordance with one embodiment of the present invention.

When USER-1 clicks on the "forced online" button 571, a window 574 opens with multiple buttons for USER-1 to choose from, as shown in FIG. 5D in one embodiment.

USER-1 can choose button 575 for "forced online", or button 576 for "no change", Afterwards, USER-1 can click on the "done" button 577 to enter the selection and to close the window 574. A "forced offline" button 571 is only an embodiment in accordance with the present invention. In another embodiment, USER-1 can click on the arrow 573 in USER-1 online presence box 572 of FIG. 5C. When USER-1 clicks on arrow 573, a list of online presence choices is displayed below box 572, as shown in FIG. 5E. USER-1 can choose one of the online presences to change USER-1's online presence from "offline" to "online".

Figure 6:
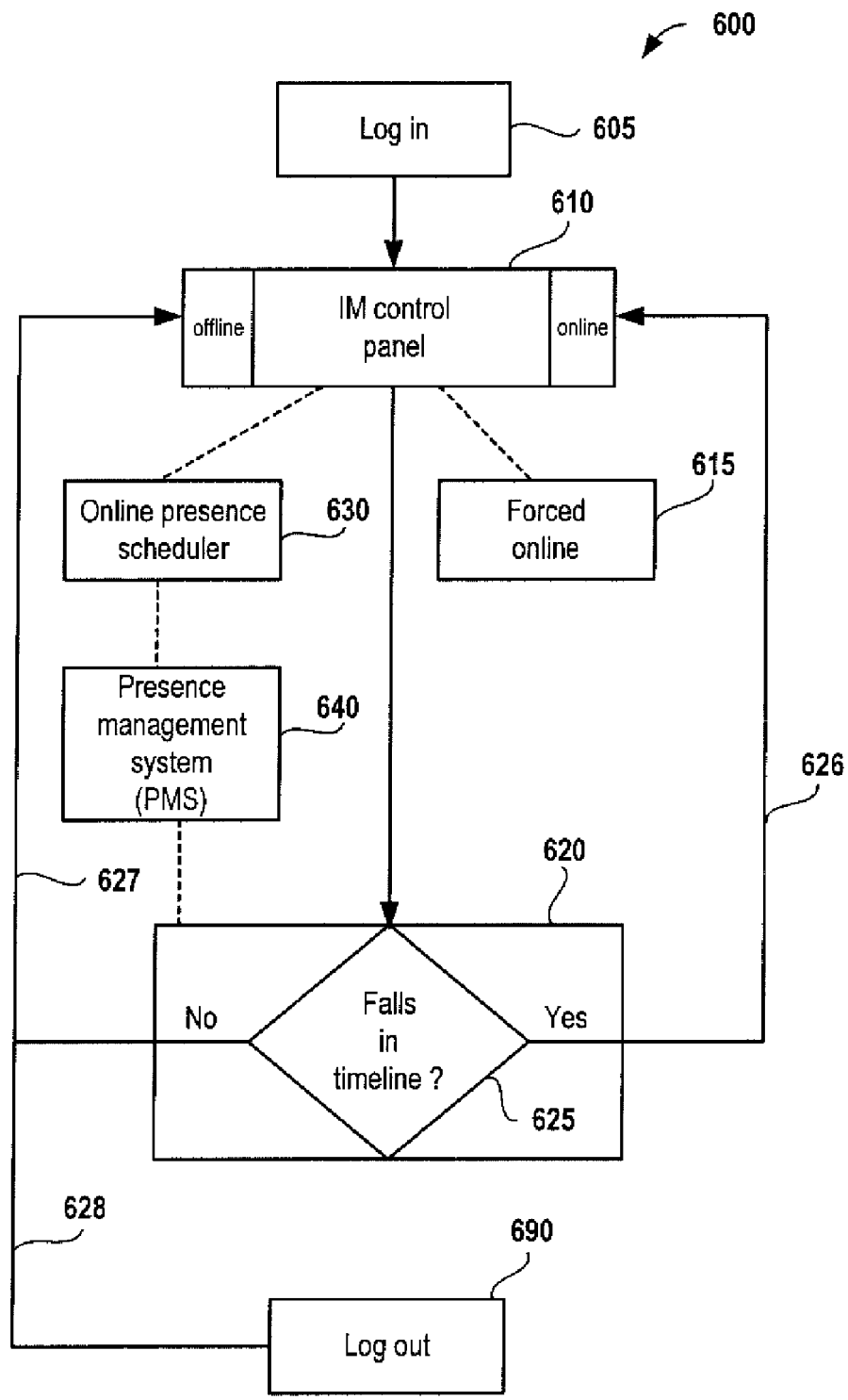
FIG. 6 shows a process flow diagram for online presence determination.

FIG. 6 shows a process flow diagram 600 for online presence determination. An IM user first performs a "login" action 605 by accessing an IM control panel 610. The login information, which includes user's identification and login time, is sent to OSD 620. OSD 620 decides whether the user is scheduled to appear "online" or "offline" by is checking to see if the login time falls within the scheduled online time with a decision-making action 625. If the result is "yes", the presence of "online" is sent to the control panel 610 through route 626. If the answer is "no", the presence of "offline" is sent to the control panel 61—through route 627. When the user takes a "logout" action 690, the "offline" presence is sent to the control panel 610 through route 628. In one embodiment, route 628 is separate from route 627.

The IM control panel 610 can have a mean, or method, to access the online presence scheduler 630, which is similar to online presence scheduler 455 described above. As described above, the mean can be the online presence schedule button 450 of FIG. 4A described above. The online presence scheduler 630, which is coupled to the presence management server (PMS) 640, which is similar to the PMS 500 described above. The IM control panel 610 can also has a mean, such as button 451, to activate "forced online" action, which is described above.

The embodiments described above mainly focus on systems and methods allowing users to appear "offline", while they are actually online. However, similar systems and methods can be created to allow users to appear "online", while they are actually "online". For example, a user might want his/her colleagues to think that the user is "online", while the user is actually offline.

The online presence scheduling system described above allows users to schedule their online presence. Users can have their desired online presence at the time they desire. Online presence scheduling relieves the users from having to manually change their online presence from online to offline during hours that users prefer to be considered offline. Although the online presence of users are described to be shown in the IM control panels, online presence of users are not limited to be shown in IM control panels. Users' online presence can also be shown on other IM clients coupled to the IM servers.

Any of the operations (or processes) described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations (or processes).

The above-described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method of scheduling and displaying an online presence status of a user of an instant messaging (IM) application, comprising:

setting a routine online schedule of the user, the routine including a start time, an end time, a time zone, and a routine status that indicates a preference of the user to appear online or offline in the IM application between the start time and the end time;

determining the online presence status of the user in the IM application as online or offline based on the routine online schedule of the user and a current time, wherein the online presence status is set to be equal to the routine status when the current time is between the start time and the end time for said time zone regardless of the user being online or offline in the IM application, wherein the online presence status is not equal to the routine status when the current time is not between the start time and the end time, wherein the user appears online in the IM application if the user desires to appear online according to the routine status even if the user is offline in the IM application, the routine online schedule of the user being stored to enable the determining of the online presence status of the user; and displaying the determined online presence status of the user in an IM control panel of other users, wherein each operation of the method is executed by a processor.

2. The method of claim 1, further comprising:
displaying the determined online presence status of the user in an IM control panel of another user who has logged into the IM application and has the user on an IM friend list.

3. The method of claim 1, further comprising:
updating the online presence status of the user periodically; and
displaying the updated online presence status.

4. The method of claim 3, wherein updating the online presence status is performed every 15 minutes.

5. The method of claim 1, further comprising:
performing a forced online action by the user to change the determined online presence status; and
displaying the changed online presence status of the user after the forced online action is performed.

6. The method of claim 1, further comprising:
setting another routine online schedule, which includes another start time, another end time, and another routine status of the user.

7. The method of claim 1, wherein the routine online schedule of the user further includes daily, weekdays, and weekend application.

8. A system of scheduling and displaying an online presence of a user of an instant messaging (IM) application, comprising:
a processor in a computer system;
an online presence scheduler for scheduling a routine online schedule for the user to appear online or offline in the IM application, wherein the routine online schedule includes a start time, an end time, a time zone, and a routine status that indicates a preference of the user to appear online or offline between the start time and the end time; and a presence management server (PMS), wherein the PMS determines an online presence status of the user in the IM application based on the routine online schedule for the user, a current time, and an identification of the user, wherein the PMS prepares an online presence information to reflect the determined online presence status of the user for display to other users, wherein the online presence information is set to be equal to the routine status when the current time is between the start time and the end time for said time zone regardless of the user being online or offline in the IM application, wherein the online presence information is not equal to the routine status when the current time is not between the start time and the end time, wherein the routine online schedule of the user and the identification of the user are stored in the PMS; wherein operations of the online presence scheduler and the PMS are executed by the processor.

9. The system of claim 8, wherein the PMS includes an online presence decider, which decides the online presence status, and an online presence indicator, which prepares the online presence information to reflect the determined online presence status.

10. The system of claim 9, wherein the online presence decider further includes:

an online presence schedule storage, which stores the time zone, the online schedule, and the identification of the user, and a time synchronizer and keeper, which synchronizes a login time the user with a system time of the PMS and keeps the time zone of the user.

11. The system of claim 8, further comprising:

a forced online button, which allows the user to change the online presence status.

12. The system of claim 8, wherein the PMS is coupled to an IM server of the IM application.

13. The system of claim 8, further comprising:

an IM control panel for displaying the online presence information of the user, wherein, the user accesses the online presence scheduler from the IM control panel.

14. Computer readable non-transitory media including program instruction for scheduling and displaying an online presence status of a user of an instant messaging (IM) application, comprising:

program instruction for setting a routine online schedule of the user, the routine including a start time, an end time, a time zone, and a routine status that indicates a preference of the user to appear online or offline in the IM application between the start time and the end time;

program instruction for determining the online presence status of the user in the IM application as online or offline based on the routine online schedule of the user and a current time, wherein the online presence status is set to be equal to the routine status when the current time is between the start time and the end time for said time zone regardless of the user being online or offline in the IM application, wherein the online presence status is not equal to the routine status when the current time is not between the start time and the end time, wherein the user appears online in the IM application if the user desires to appear online according to the routine status even if the user is offline in the IM application, the routine online schedule of the user being stored to enable the determining of the online presence status of the user; and program instruction for displaying the determined online presence status of the user in an IM control panel of other users.

15. The computer readable media of claim 14, further comprising:

program instruction for displaying the determined online presence status of the user in an IM control panel of another user who has logged into the IM application and has the user on an IM friend list of the other user.

16. The computer readable media of claim 14, wherein the determined online presence status of the user is displayed by an online presence information, which reflects the determined online presence of the user.

17. The computer readable media of claim 14, further comprising:

program instruction for performing a forced online action by the user to change the determined online presence status; and program instruction for displaying the changed online presence status of the user after the forced online action is performed.

18. The method of claim 1, wherein the routine status is equal to online, wherein the online presence status is equal to online between the start time and the end time and the online presence status is equal to offline before the start time and after the end time.

19. The method of claim 1, wherein the routine status is equal to offline, wherein the online presence status is equal to offline between the start time and the end time and the online presence status is equal to online before the start time and after the end time.

* * * * *